United States Patent
Lopez et al.

(10) Patent No.: US 11,638,136 B2
(45) Date of Patent: Apr. 25, 2023

(54) RADIO CHANNEL FAST SCANNING

(71) Applicant: Telefonaktiebolaget LM Ericsson (publ), Stockholm (SE)

(72) Inventors: Miguel Lopez, Solna (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1135 days.

(21) Appl. No.: 16/250,684

(22) Filed: Jan. 17, 2019

(65) Prior Publication Data

US 2020/0236571 A1    Jul. 23, 2020

(51) Int. Cl.
*H04W 4/80* (2018.01)
*H04B 7/22* (2006.01)
*H04L 27/20* (2006.01)
*H04W 24/10* (2009.01)
*H04W 72/0453* (2023.01)

(52) U.S. Cl.
CPC ............ *H04W 4/80* (2018.02); *H04B 7/22* (2013.01); *H04L 27/2042* (2013.01); *H04W 24/10* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 6,838,989 B1* | 1/2005 | Mays | ................. | G06K 19/0723 342/51 |
| 11,171,678 B2* | 11/2021 | Hoang | ..................... | H04B 1/04 |
| 2006/0220794 A1 | 10/2006 | Zhu | | |
| 2016/0092706 A1* | 3/2016 | Deyle | ................. | G06K 19/0723 340/10.1 |
| 2016/0365890 A1* | 12/2016 | Reynolds | ........... | G06K 19/0723 |
| 2017/0373892 A1* | 12/2017 | Ganesan | ............... | H04B 1/0475 |
| 2018/0269909 A1* | 9/2018 | Reynolds | ................. | H04B 5/00 |
| 2018/0331865 A1* | 11/2018 | Ziv | ......................... | H04L 27/00 |
| 2018/0375703 A1* | 12/2018 | Kellogg | ................ | H04L 5/0007 |

(Continued)

FOREIGN PATENT DOCUMENTS

| | | | | |
|---|---|---|---|---|
| WO | WO-2017027847 A1 * | 2/2017 | ............... | H04B 1/40 |
| WO | 2018081319 A1 | 5/2018 | | |

OTHER PUBLICATIONS

Joshua F. Ensworth et al.; Every Smart Phone is a Backscatter Reader: Modulated Backscatter Compatibility with Bluetooth 4.0 Low Energy (BLE) Devices; 2015 IEEE International Conference on RFID (RFID); 2015, consisting of 8—pages.

(Continued)

*Primary Examiner* — Gennadiy Tsvey
(74) *Attorney, Agent, or Firm* — Christopher & Weisberg, P.A.

(57) ABSTRACT

An apparatus, method and wireless device for fast scanning of a wireless communications medium are disclosed. According to one aspect, a method includes tuning a transceiver of the wireless node to a first frequency. The method further includes computing a first difference frequency, the first difference frequency being a difference between the first frequency and a second frequency. The method further includes generating a first control signal to configure a first backscattering device to switch between at least two states at a switching frequency equal to the first difference frequency.

10 Claims, 10 Drawing Sheets

(56) References Cited

U.S. PATENT DOCUMENTS

| | | | |
|---|---|---|---|
| 2019/0158341 A1* | 5/2019 | Talla | H04L 27/365 |
| 2019/0173543 A1* | 6/2019 | Ganesan | H04W 4/80 |
| 2020/0052734 A1* | 2/2020 | Talla | H04B 1/1081 |
| 2020/0212956 A1* | 7/2020 | Gollakota | H04W 74/0808 |
| 2020/0313939 A1* | 10/2020 | Lopez | H04L 27/2626 |

OTHER PUBLICATIONS

John Kimionis et al.; Enhancement of RF Tag Backscatter Efficiency with Low-Power Reflection Amplifiers; IEEE Transactions on Microwave Theory and Techniques, vol. 62, No. 12, Dec. 2014, consisting of 10—pages.

International Search Report and Written Opinion dated Mar. 17, 2020 for International Application No. PCT/EP2020/050316 filed Jan. 8, 2020, consisting of 15—pages.

3GPP TSG RAN WG1 Meeting #89 R1-1707456; Title: UE Wakeup Mechanism and On-Demand Access lor INS-IoT UE Power Saving; Agenda Item: 6.2.7.1; Source: CATT; Document for: Discussion and Decision; Location and Date: Hangzhou, China, 15th-191 May 2017; consisting of 4—pages.

3GPP TSG RAN Meeting #75 RP-170410; Motivation of UE Wakeup Mechanism in NR; CATT; Datang Telecom Technology & Industry Group; Location and Date: Dubrovnik, Croatia, Mar. 6-9, 2017, consisting of 8—pages.

\* cited by examiner

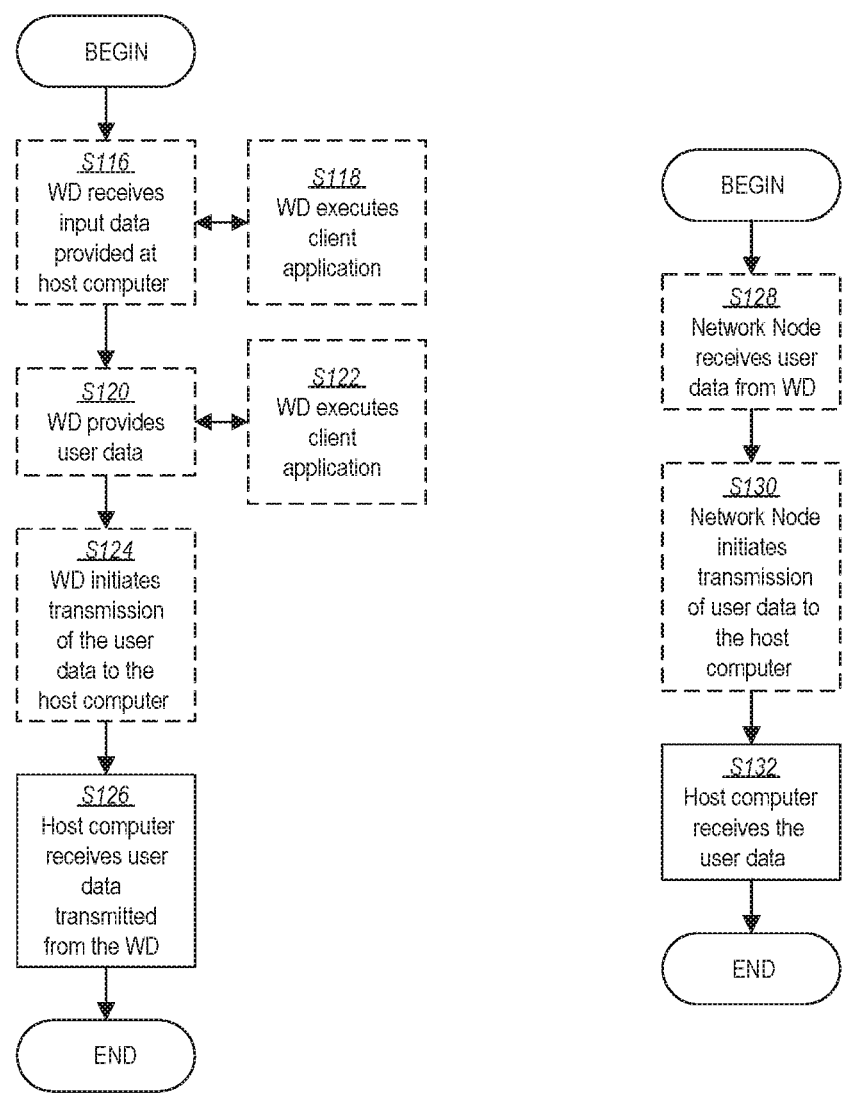

RADIO CHANNEL FAST SCANNING

TECHNICAL FIELD

This disclosure relates to wireless communication and in particular, scanning radio channels by a wireless device.

BACKGROUND

Fast scanning of radio channels is desirable in wireless communications. In particular, fast scanning is useful in wireless technologies that use frequency hopping, or when there are several possibilities for the center frequency of broadcast channels or beacons. One example of this is Multefire (MF) narrow band Internet of things (NB-IoT), a version of NB-IoT that operates in unlicensed bands. In the United States, MF NB-IoT operates in the 915 MHz industrial, scientific and medical (ISM) band. An MF NB-IoT cell transmits an anchor segment and a data segment in a multi-frame (m-frame) of 80 ms (8 radio frames). This is shown in FIG. 1.

The anchor segment includes synchronization channels, a broadcast channel, and system information, and is transmitted at a fixed frequency in a cell. However, different cells may use different frequencies for the anchor segment. A predetermined list of frequencies that can be used for transmitting the anchor segment in a MF NB-IoT network is made available. When a wireless device (WD) needs to connect to the network, it will first perform a cell search without knowing the exact frequency in the list over which the anchor segment is transmitted in its coverage area.

Therefore, the wireless device will scan to acquire synchronization and system information. Scanning over a few anchor frequencies can be a time consuming and power consuming process. A wireless device may also perform RSRP (reference signal received power) measurements on multiple anchor frequencies simultaneously. The "reference signal" for example is one or more of the signals carried in the anchor segment (e.g., synchronization signals). RSRP measurement is an essential operation in the idle mode for cell reselection. Performing idle mode cell-reselection measurements over multiple frequencies in sequential order is a time consuming process.

Narrowband devices, such as Bluetooth Low Energy (BLE) devices or NB-IoT devices, may require scanning of radio frequency (RF) channels, but are unable to scan more than one radio frequency (RF) channel at a time. Since fast scanning helps reduce latency, improve user experience and save power, a low cost, low complexity method that allows narrowband devices to speed up scanning is sought.

SUMMARY

Some embodiments advantageously provide an apparatus, method and wireless device for fast scanning of radio channels. According to one aspect, an apparatus to enable fast radio channel scanning at a wireless device is provided. The apparatus includes a transceiver configured to receive a signal at a first frequency. The controller in communication with the transceiver is configured to compute a first difference frequency, the first difference frequency being a difference between the first frequency and a second frequency and to generate a first control signal. The apparatus further includes a first backscattering device in communication with the controller, the first backscattering device having a first radio frequency, RF, switch configured by the first control signal from the controller to switch between at least two states at a switching frequency equal to the first difference frequency.

According to this aspect, in some embodiments, when a signal is received at the first backscattering device at the second frequency, the first backscattering device generates a signal at the first frequency to be detected by the transceiver, the signal generated at the first frequency being based at least in part on the signal received by the backscattering device at the second frequency. In some embodiments, the first backscattering device includes a first amplifier configured to increase a power of a signal generated by the first backscattering device. In some embodiments, the controller is further configured to compute a second difference frequency being a difference between the first frequency and a third frequency and to generate a second control signal, and the apparatus further includes a second backscattering device having a second RF switch configured by the second control signal to switch between at least two states at a switching frequency equal to the second difference frequency. In some embodiments, when a signal is received at the second backscattering device at the third frequency, the second backscattering device generates a signal at the first frequency to be detected by the transceiver, the signal generated at the first frequency being based at least in part on the signal received by the backscattering device at the third frequency. In some embodiments, the second backscattering device includes a second amplifier configured to increase a power of a signal generated by the second backscattering device. In some embodiments, the first frequency is at a center frequency $F_c$ of one of the operating RF channels of a network node.

According to another aspect, a method to enable fast radio channel scanning at a wireless node is provided. The method includes tuning a transceiver of the wireless node to a first frequency. The method also includes computing a first difference frequency, the first difference frequency being a difference between the first frequency and a second frequency. The method also includes generating a first control signal to configure a first backscattering device to switch between at least two states at a switching frequency equal to the first difference frequency.

According to this aspect, in some embodiments, when a signal is received at the first backscattering device at the second frequency, generating a signal at the first frequency to be detected by the transceiver, the signal generated at the first frequency being based at least in part on the signal received by the backscattering device at the second frequency. In some embodiments, the method further includes increasing a power of a signal generated by the first backscattering device via a first amplifier of the first backscattering device. In some embodiments, the method further includes computing a second difference frequency being a difference between the first frequency and a third frequency and generating a second control signal to configure a second backscattering device to switch between at least two states at a switching frequency equal to the second difference frequency. In some embodiments, when a signal is received at the second backscattering device at the third frequency, generating a signal at the first frequency to be detected by the transceiver, the signal generated at the first frequency being based at least in part of the signal received by the backscattering device at the third frequency. In some embodiments, the method further includes increasing a power of a signal generated by the second backscattering device via a second amplifier of the second backscattering device. In some embodiments, the first frequency is at a center frequency $F_c$ of one of the operating RF channels of a network node.

According to yet another aspect, a wireless device configured to scan a wireless communications medium is provided. The wireless device includes a transceiver configured to receive a signal at a first frequency. The wireless device includes a controller in communication with the transceiver and configured to compute a first difference frequency, the first difference frequency being a difference between the first frequency and a second frequency. The wireless device also includes a first backscattering device in communication with the controller and being configured to switch between at least two states at a first switching frequency equal to the first difference frequency.

According to this aspect, in some embodiments, the first backscattering device alternately transmits at the first frequency plus the first switching frequency and at the first frequency minus the first switching frequency. In some embodiments, the first backscattering device is configured to amplify a signal transmitted by the first backscattering device. In some embodiments, the wireless device further includes a second backscattering device being configured to switch between at least two states at a second switching frequency computed by the controller, the second switching frequency being a difference between the first frequency and a third frequency. In some embodiments, the second backscattering device alternately transmits at the first frequency plus the second switching frequency and at the first frequency minus the second switching frequency. In some embodiments, the second backscattering device includes a second amplifier configured to increase a power of a signal generated by the second backscattering device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

Figure 1:
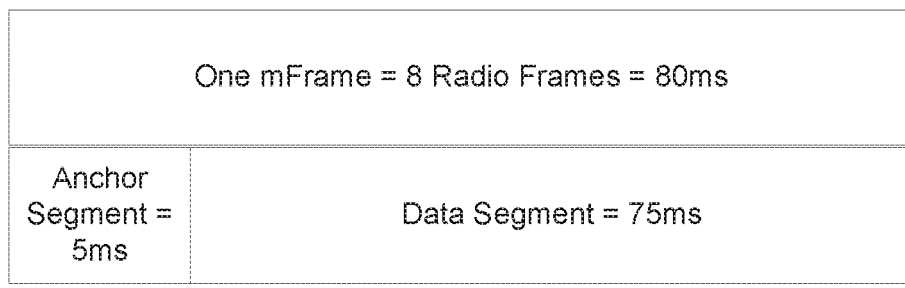
FIG. 1 illustrates an 8 frame multi-frame.

Before describing in detail exemplary embodiments, it is noted that the embodiments reside primarily in combinations of apparatus components and processing steps related to scanning of radio channels by a wireless device. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
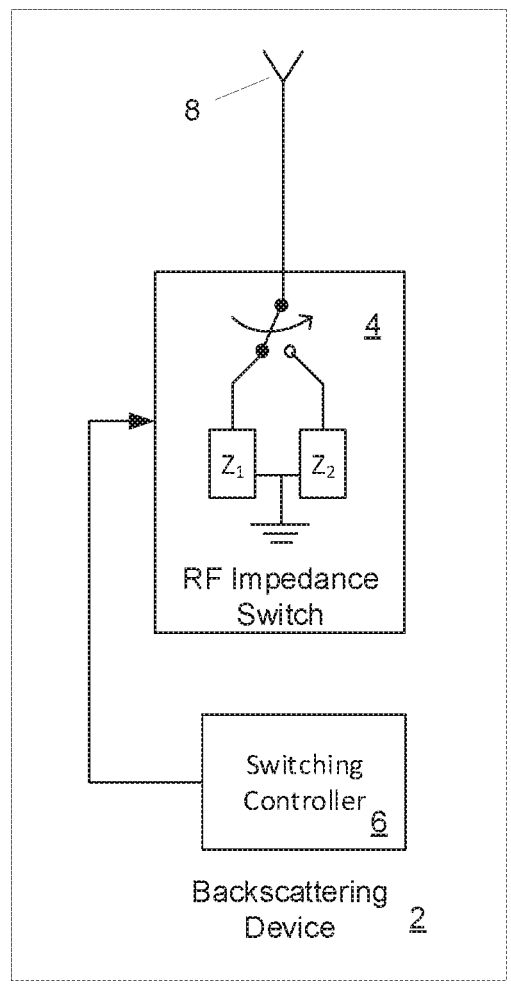
FIG. 2 is a block diagram of a backscattering device.

Embodiments described herein utilize backscattering devices to enable fast scanning of radio channels by a wireless device. Backscattering wireless devices reflect impinging radio signals and may lack power amplifiers, filters, mixers and other components that consume power and increase the bill of materials for their manufacture. FIG. 2 is a block diagram of an example backscattering device 2 constructed in accordance with the principles of the present disclosure. In the embodiment shown in FIG. 2, the backscattering device 2 has an RF switch 4, in communication with a switching controller 6. The backscattering device has an antenna 8 in communication with the RF switch 4. Some backscattering devices 2 are energy efficient because they only consume power to switch the load connected to the antenna 8. In some embodiments, the switching controller 6 controls the switching frequency of the switch 4. In one embodiment, the switch 4 can be a single Field Effect Transistor (FET). In FIG. 2, the impedances Z1 and Z2 may be grounded at one terminal and selected to achieve a reflection coefficient that alternates between +1 and −1. Backscattering devices may possess more than two impedances, and the RF switch is used to choose which impedance is connected to the antenna.

In operation, the backscattering device 2 of FIG. 2 is configured to switch between two states to produce a signal that is carried at a sum frequency and at a difference frequency, described as follows. An RF signal $r_{RF}(t)$ having an amplitude A, frequency $F_c$ and phase $\varphi(t)$ can be described in the following form:

$$r_{RF}(t) = A \sin(2\pi F_c t + \varphi(t))$$

Suppose that the reflection coefficients corresponding to the two loads, Z1 and Z2, in FIG. 2 are +1 and −1, respectively, and that the switching controller 6 of the backscattering device 2 causes the switch 4 to switch states with a constant frequency $F_{sw}$. Then, the signal $r_{sw}(t)$ driving the switch 4 is a square wave which can be written in the form $$r_{sw}(t) = \frac{4}{\pi}\left(\sin(2\pi F_{sw}t) + \frac{1}{3}\sin(2\pi \cdot 3 \cdot F_{sw}t) + \frac{1}{5}\sin(2\pi \cdot 5 \cdot F_{sw}t) + \ldots\right).$$

When the RF signal $r_{RF}(t)$ impinges on the antenna 8 of the backscattering device 2, and the switch 4 is driven by the square wave $r_{sw}(t)$, an RF signal, $r_{reflect}(t)$, reflected by the backscattering device 2, can be modelled as $$r_{reflect}(t) = \gamma \cdot r_{sw}(t) \cdot r_{RF}(t),$$

where $\gamma$ is a slowly varying gain that can be considered constant for practical purposes. That is, the reflected signal is the product of the impinging signal and the driving signal. This corresponds to mixing the RF signal with an intermediate frequency signal. Using elementary trigonometric identities, it is easily seen that $$r_{reflect}(t) = A\gamma(\cos(2\pi(F_c - F_{sw})t + \varphi(t)) - \cos(2\pi(F_c + F_{sw})t + \varphi(t)) + \tfrac{1}{3}\cos(2\pi(F_c - 3F_{sw})t + \varphi(t)) - \tfrac{1}{3}\cos(2\pi(F_c + 3F_{sw})t + \varphi(t)) + \ldots).$$

Figure 3:
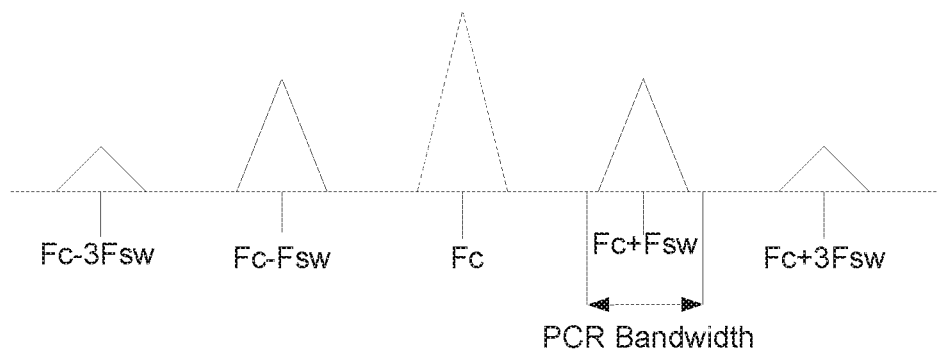
FIG. 3 is a graph of a frequency spectrum generated by a backscattering device.

That is, the reflected signal is a copy of the impinging signal, but translated in frequency from $F_c$ to $(F_c \pm F_{sw})$, and also to $(F_c \pm 3F_{sw})$, $(F_c \pm 5F_{sw})$, etc. The reflected signal may therefore be also referred to as the signal generated by the backscattering device 2. The images at $(F_c \pm F_{sw})$ contain around 80% of the total reflected energy. This is illustrated in FIG. 3.

Embodiments described herein complement a principal communications radio (PCR) in a wireless device by including as part of the wireless device, one or more backscattering devices 2 that are controlled by the wireless device. The wireless device tunes a transceiver of its PCR to a first operating frequency, corresponding to the center frequency $F_c$ of one of the operating RF channels of a network node, and scans the wireless medium for incoming signals. The wireless device also calculates the difference in frequency between the first operating frequency and a second operating frequency. While scanning the medium, the wireless device may command its backscattering device 2 to switch at a frequency that is equal to the difference frequency. If the desired signal is transmitted by a serving network node at the first operating frequency, then the PCR of the wireless device will receive it. If instead, the desired signal is transmitted by the serving network node at the second operating frequency, the backscattering device 2 will reflect the desired signal, while at the same time translating it in frequency to the first operating frequency so that it can be received by the PCR.

Figure 4:
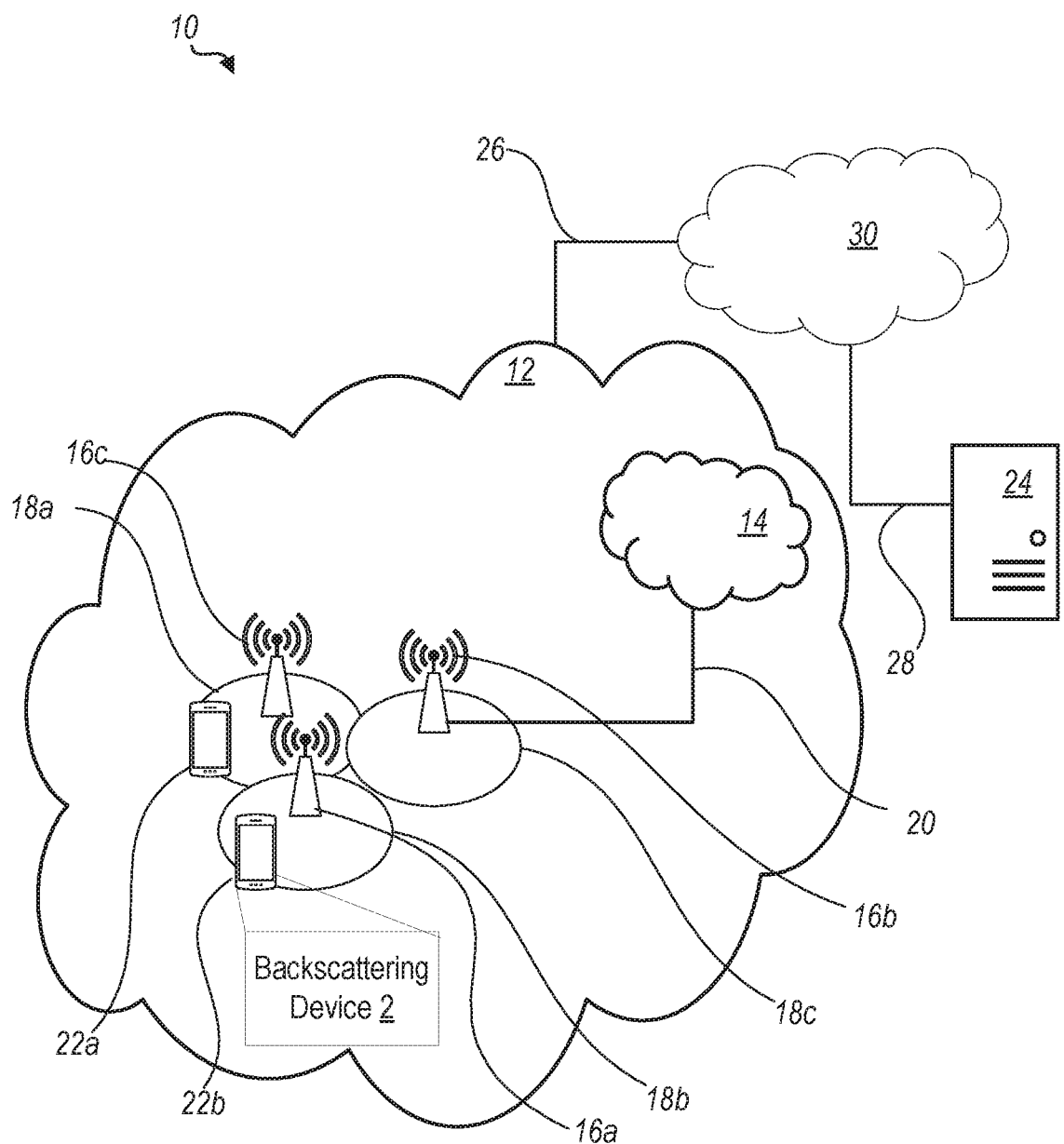
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A wireless device 22 is configured to include a backscattering device 2, which includes the switch 4 and the switching controller 6. As discussed above, the switching controller 6 is configured to determine a switching frequency and direct the switch 4 to switch states at the computed switching frequency. In some embodiments, the determination of the switching frequency may be computed by an element other than the switch 4, such as another element of the processing circuitry of the WD 22, and then provided to the switch 4. In some embodiments, the switching frequency computation is performed by an element other than the WD 22 and then provided to the switch 4 for determination. In other words, the determination of the switching frequency can include actual computation by the switch 4 or acquisition by the switch 4.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. Also, the radio interface 62 has one or more antennas 65 coupled to the one or more RF transceivers to transmit signals to and receive signals from the WD 22. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. In particular, the radio interface 82 may include one or more antennas 85 coupled to a transceiver 87 in a principle communications radio (PCR) 83 of the radio interface 82, and may include an antenna 8 coupled to a backscattering device 2.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). In some embodiments, the processing circuitry includes the backscattering device 2. In other embodiments, the backscattering device 2 or at least the switching controller 6 and switch 4 may be included instead in the radio interface 82. Further, in some embodiments, the switching controller 6 of the backscattering device 2 may be implemented in the processor 86.

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a backscattering device 2 having a switching controller 6 which is configured to compute a switching frequency and direct a switch 4 of the backscattering device 2 to switch states at the computed switching frequency. In some embodiments, the switch 4 may be located in the radio interface 82.

Figure 5:
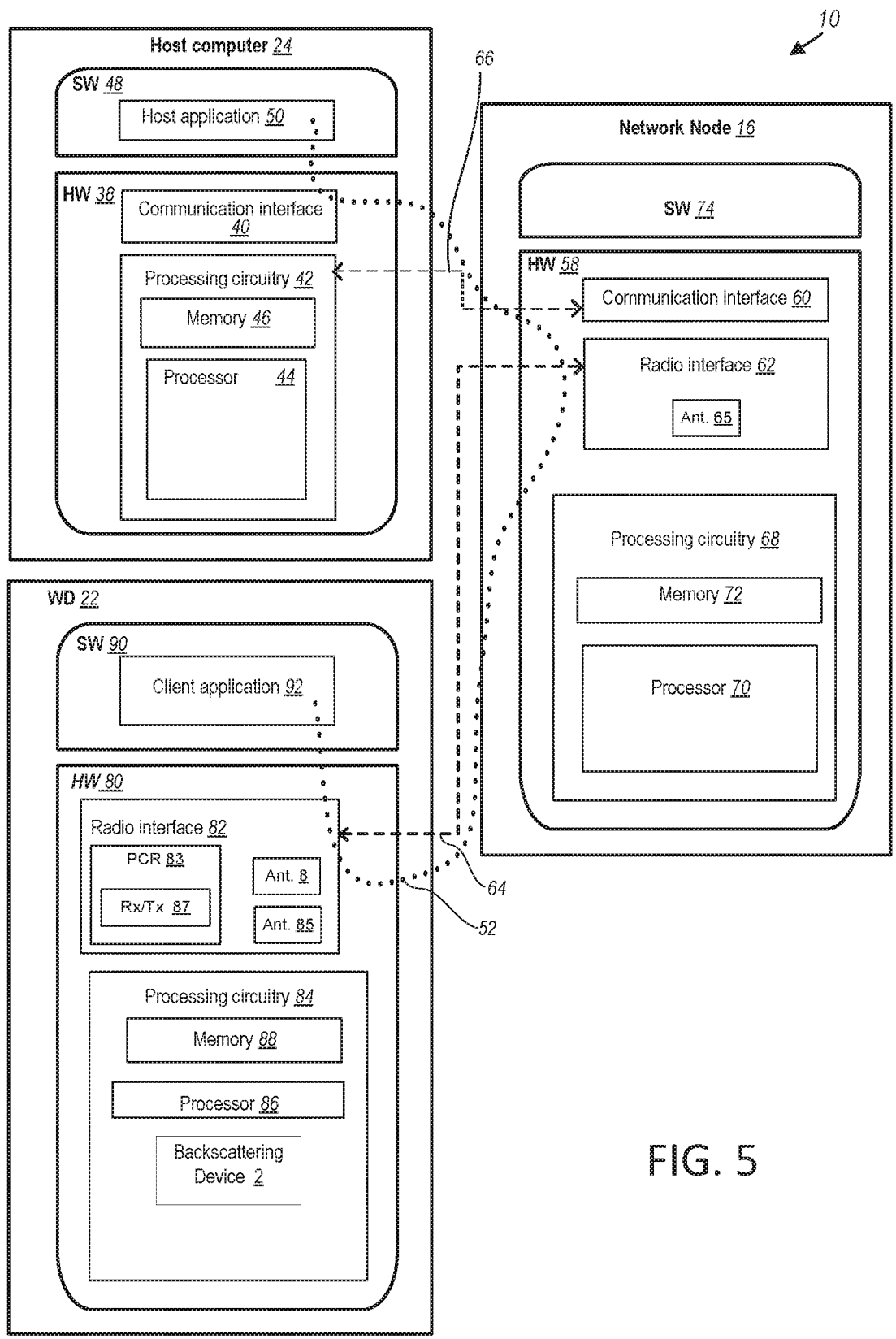
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Note that it is contemplated that functional units to perform functions described herein may be implemented such that a portion of the unit is stored in a corresponding memory within the processing circuitry. In other words, the units may be implemented in hardware or in a combination of hardware and software within the processing circuitry.

Figures 6, 7:
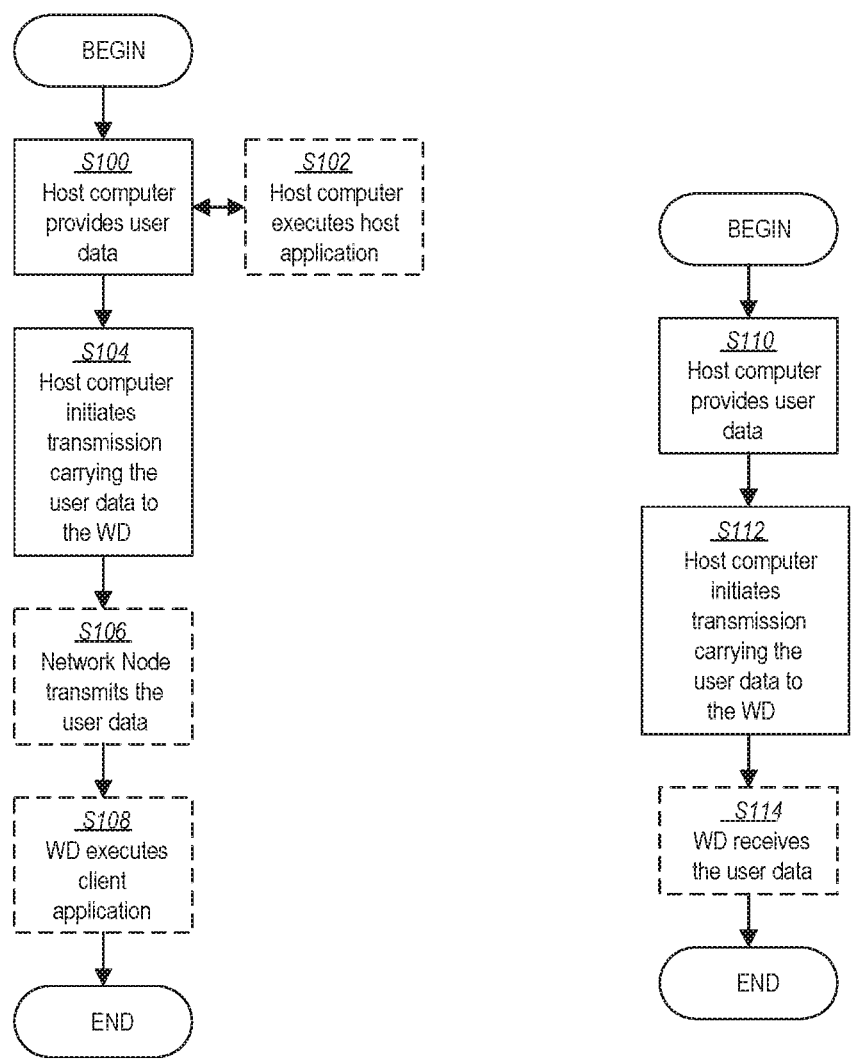
FIG. 6 is a flowchart illustrating exemplary methods implemented in a communication system including a host computer, a network node and a wireless device for executing a client application at a wireless device according to some embodiments of the present disclosure.
FIG. 7 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
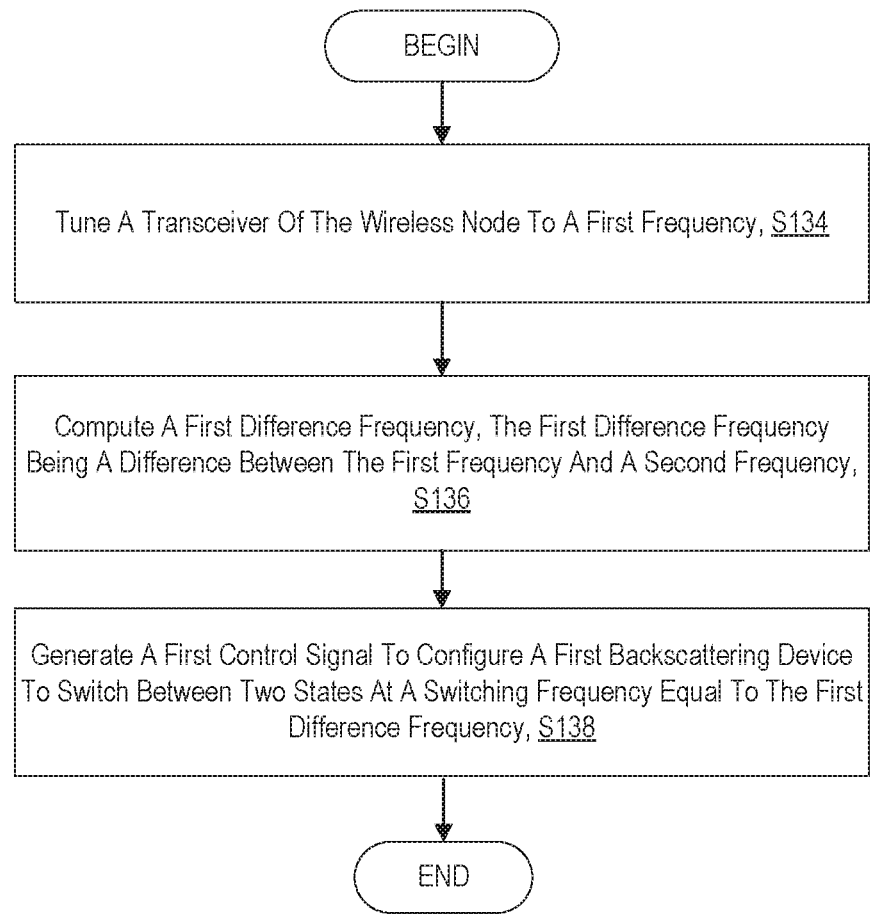
FIG. 10 is a flowchart of an exemplary process in a wireless device according to some embodiments of the present disclosure.

FIG. 10 is a flowchart of an exemplary process in a wireless device 22 for fast scanning of radio channels. The process includes tuning, via the processor 86, the transceiver 87 of PCR 83 of radio interface 82 of the wireless device 22 to a first frequency (Block S134). The process also includes computing, via the switching controller 6, a first difference frequency being a difference between the first frequency and a second frequency (Block S136). The process further includes generating, via the switching controller 6, a first control signal to configure a switch 4 of the first backscattering device 2 to switch between at least two states at a switching frequency equal to the first difference frequency (Block S138).

In operation, the wireless device 22 tunes the transceiver 87 of the PCR 83 of its radio interface 82 to a first operating frequency, corresponding to the center frequency $F_c$ of one of the operating RF channels of a network node 16, and scans the wireless medium for incoming signals. The wireless device 22 also calculates the difference in frequency between the first operating frequency and a second operating frequency. While scanning the medium, the wireless device 22 may command the backscattering device 2 to switch at a frequency that is equal to the difference frequency. If the desired signal is transmitted by the network node 16 at the first operating frequency, then the PCR 83 of the wireless device will receive it. If instead, the desired signal is transmitted at the second operating frequency, the backscattering device 2 will reflect the desired signal, while at the same time translating it in frequency to the first operating frequency so that it can be received by the radio interface PCR 83 of the radio interface 82.

Having described the general process flow of arrangements of the disclosure and having provided examples of hardware and software arrangements for implementing the processes and functions of the disclosure, the sections below provide details and examples of arrangements for scanning radio channels by a wireless device 22.

Figure 11:
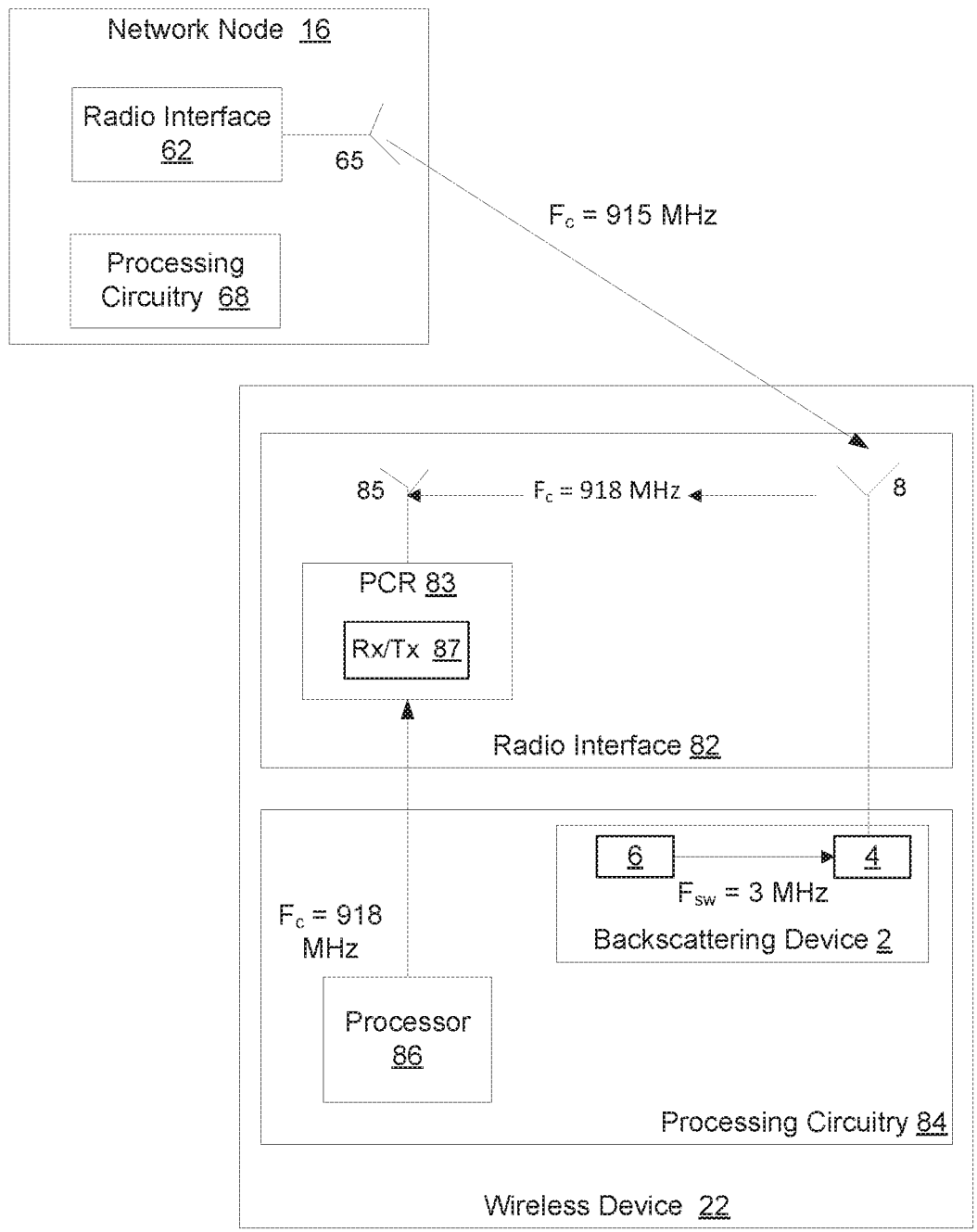
FIG. 11 is a block diagram of a network node in communication with a wireless device including a backscattering device.

Referring to FIG. 11, suppose that the wireless system operates in the 902-928 MHz ISM band, e.g., an MF NB-IoT system. Suppose that a radio interface 62 of the network node 16 is sending signals in an RF channel, via the antenna 65, with a center frequency at 915 MHz. The fast scanning wireless device 22, according to some embodiments, tunes its PCR 83 of radio interface 82 at 918 MHz and scans the medium. In addition, the switching controller 6 commands the switch 4 of the backscattering device 2 to switch at a frequency of 3 MHz. Note that as shown in FIG. 11, there will be one reflected image at 915 MHz=918 MHz−3 MHz, which the PCR 83 will be able to decode, thus speeding up the scanning process.

Figure 12:
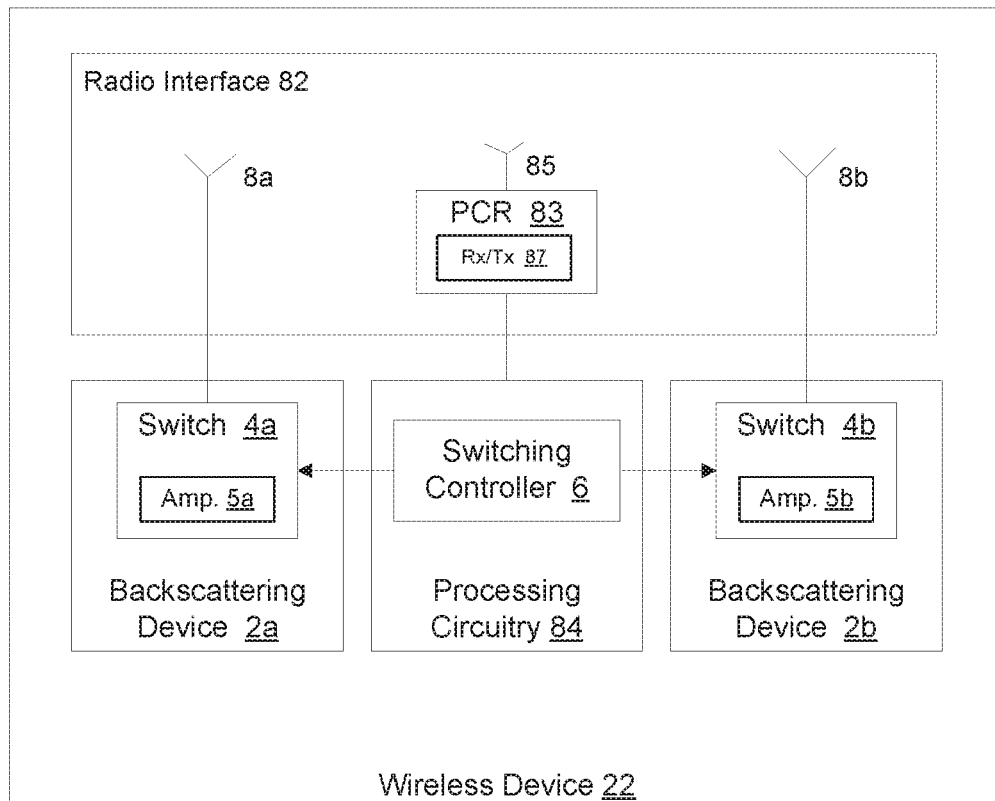
FIG. 12 is block diagram of a wireless device with multiple backscattering devices.

Note that more than one backscattering device 2 may be included in the wireless device 22. For example, FIG. 12 shows a wireless device 22 having two backscattering devices 2a and 2b. Backscattering device 2a has a switch 4a and backscattering device 2b has a switch 4b. In some embodiments, the switches 4a and 4b may have reflection amplifiers 5a and 5b, respectively, which may be used to amplify a signal generated by the backscattering device 2a and 2b, respectively. Reflection amplifiers 5a and 5b may be referred to herein collectively as amplifiers or reflection amplifiers 5. The processing circuitry 84 of the wireless device 22 has a switching controller 6 that controls the switching frequency of both switches 4a and 4b. Thus, the wireless device 22 may scan channels by first tuning the radio to a first frequency, compute a switching frequency for each backscattering device 2a and 2b, scanning the wireless medium and simultaneously causing the switches 4a and 4b to switch at the computed frequencies. For example, a first switching frequency for backscattering device 2a can be the difference between the first frequency and a second frequency, and a second switching frequency for backscattering device 2b can be the difference between the first frequency and a third frequency.

Note that the switching controller 6 in FIG. 12 is located in the processing circuitry 84 and shown separately from the backscattering devices 2a and 2b. In other embodiments, a different switching controller may be in each of switches 4a and 4b, in which case the processing circuitry 84 may instruct each switching controller as to what frequency for switching should be implemented in each switch 4a and 4b. Note that although two backscattering devices are shown in FIG. 12, in some embodiments more than two backscattering devices may be implemented in the wireless device 22.

Note that signals reflected by the backscattering module may be damped, compared to signals impinging the radio interface antenna without having been reflected by the backscattering device. Hence, even though the sensitivity of the PCR 83 is not affected by the addition of the backscattering module, the range of the backscattered channels will be shorter than the range of the direct channels. Suppose $P_i$ is the incident power at either the antenna 85 or the antenna 8. If the transmitter of the network node 16 and the wireless device PCR 83 are tuned to the same frequency, then the power of the signal impinging on the PCR antenna 85 is simply $P_i$. However, if the transmitter of the network node 16 and the PCR 83 are tuned to different frequencies, the desired signal will first be reflected and hence damped. The amount of damping depends on the efficiency of the backscattering device 2, which can be quantified by means of the differential radar cross-section $\Delta\sigma$:

$$\Delta\sigma = \frac{\lambda^2 G_{backscatter}^2 |\Delta\Gamma|^2 \beta_{spectral\text{-}loss}}{4\pi}$$

where $\lambda$ is the wavelength, $G_{backscatter}$ is the backscattering module antenna gain, $|\Delta\Gamma|$ is the difference between the reflection coefficients of the backscattering module and $\beta_{spectral\text{-}loss} = -4$ dB accounts for the fact that more than half of the power is backscattered out of the receiver band, as shown in FIG. 3. After reflection, the incident power $P_i$ may be damped by an amount $\Delta\sigma$. Since the PCR 83 and backscattering antennas 8 are very close, in many cases just a few centimeters apart, there will be coupling effects, which are difficult to describe generically since they depend on the design of the antenna system. Due to the term $\lambda^2$ in the differential radar cross section, operation in low frequency bands is more advantageous than operation in high frequency bands. As an example, operation in the 900 MHz band diminishes the damping losses by 8.5 dB compared to operation in the 2.4 GHz band.

As an illustration, the differential radar cross section can be computed for backscattering using the following parameters: $\lambda=0.33$ m (915 MHz), $G_{backscatter}=2$ dBi and $|\Delta\Gamma|=1.1$. This gives $\Delta\sigma=-18.5$ dB.

The reflection loss can be somewhat mitigated by means of reflection amplifiers 5a, 5b, which can boost the reflected signal by 10 dB or more. Thus, for operating frequencies in the range 900-2400 MHz, a rough estimate gives reflection losses in the order of 10 dB to 30 dB, depending on the backscattering module design and the frequency band. MF NB-IoT is designed for low-power wide-area (LPWA) use cases, which supports communication links with path loss equivalent to or higher than typical cellular coverage. The use cases of MF NB-IoT however are not limited to LPWA. For example, MF NB-IoT can be deployed for "local coverage", with a range similar to that offered by Wi-Fi or Bluetooth. In these use cases, even with 10-30 dB of reflection loss, the WD can still have sufficient signal strength to perform cell search or cell reselection measurements. Furthermore, in the case of cell reselection measurements, the obtained RSRP measurements can be compensated according to the reflection loss.

Backscattering also produces some out of band emissions, as shown in FIG. 3. However, the path loss may be very high and the backscattering power may be quite low, so that the interference caused by these out of band emissions is tolerable in many practical applications.

Some embodiments may be particularly useful in wireless devices 22 embedded in machines that are wirelessly connected to the Internet by enabling these machines to speed up the radio channel scanning process. The main addition to the wireless device 22 are backscattering devices 2, whose bill of materials may be cheap and whose power consumption may be low. By speeding up scanning, both latency and power consumption are reduced. The sensitivity and characteristics (e.g., bandwidth) of the PCR 83 are unaffected.

Thus, according to one aspect, an apparatus to enable fast radio channel scanning at a wireless device 22 is provided. The apparatus includes a transceiver 87 configured to receive a signal at a first frequency. The controller 6 in communication with the transceiver 87 is configured to compute a first difference frequency, the first difference frequency being a difference between the first frequency and a second frequency and to generate a first control signal. The apparatus further includes a first backscattering device 2 in communication with the controller 6, the first backscattering device 2 having a first radio frequency, RF, switch 4 configured by the first control signal from the controller 6 to switch between at least two states at a switching frequency equal to the first difference frequency.

According to this aspect, in some embodiments, when a signal is received at the first backscattering device 2 at the second frequency, the first backscattering device 2 generates a signal at the first frequency to be detected by the transceiver 87, the signal generated at the first frequency being based at least in part on the signal received by the backscattering device 2 at the second frequency. In some embodiments, the first backscattering device 2 includes a first reflection amplifier 5 configured to increase a power of a signal generated by the first backscattering device 2. In some embodiments, the controller 6 is further configured to compute a second difference frequency being a difference between the first frequency and a third frequency and to generate a second control signal, and the apparatus further includes a second backscattering device 2 having a second RF switch 4 configured by the second control signal to switch between at least two states at a switching frequency equal to the second difference frequency. In some embodiments, when a signal is received at the second backscattering device 2 at the third frequency, the second backscattering device 2 generates a signal at the first frequency to be detected by the transceiver 87, the signal generated at the first frequency being based at least in part on the signal received by the backscattering device 2 at the third frequency. In some embodiments, the second backscattering device 2 includes a second amplifier 5 configured to increase a power of a signal generated by the second backscattering device 2. In some embodiments, the first frequency is at a center frequency $F_c$ of one of the operating RF channels of a network node.

According to another aspect, a method to enable fast radio channel scanning at a wireless device 22 is provided. The method includes tuning a transceiver 87 of the wireless device 22 to a first frequency (Block S134). The method also includes computing a first difference frequency, the first difference frequency being a difference between the first frequency and a second frequency (Block S136). The method also includes generating a first control signal to configure a first backscattering device 2 to switch between at least two states at a switching frequency equal to the first difference frequency (Block S138).

According to this aspect, in some embodiments, when a signal is received at the first backscattering device 2 at the second frequency, generating a signal at the first frequency to be detected by the transceiver 87, the signal generated at the first frequency being based at least in part on the signal received by the backscattering device 2 at the second frequency. In some embodiments, the method further includes increasing a power of a signal generated by the first backscattering device 2 via a first reflection amplifier 5 of the first backscattering device 2. In some embodiments, the method further includes computing a second difference frequency being a difference between the first frequency and a third frequency and generating a second control signal to configure a second backscattering device 2 to switch between at least two states at a switching frequency equal to the second difference frequency. In some embodiments, when a signal is received at the second backscattering device 2 at the third frequency, generating a signal at the first frequency to be detected by the transceiver 87, the signal generated at the first frequency being based at least in part of the signal received by the backscattering device 2 at the third frequency. In some embodiments, the method further includes increasing a power of a signal generated by the second backscattering device 2 via a second reflection amplifier 5 of the second backscattering device 2. In some embodiments, the first frequency is at a center frequency $F_c$ of one of the operating RF channels of a network node.

According to yet another aspect, a wireless device 22 configured to scan a wireless communications medium is provided. The wireless device 22 includes a transceiver 87 configured to receive a signal at a first frequency. The wireless device 22 includes a controller 6 in communication with the transceiver 87 and configured to compute a first difference frequency, the first difference frequency being a difference between the first frequency and a second frequency. The wireless device 22 also includes a first backscattering device 2 in communication with the controller 6 and being configured to switch between at least two states at a first switching frequency equal to the first difference frequency.

According to this aspect, in some embodiments, the first backscattering device 2 alternately transmits at the first frequency plus the first switching frequency and at the first frequency minus the first switching frequency. In some embodiments, the first backscattering device 2 is configured to amplify a signal transmitted by the first backscattering device 2. In some embodiments, the wireless device 22 further includes a second backscattering device 2 being configured to switch between at least two states at a second switching frequency computed by the controller 6, the second switching frequency being a difference between the first frequency and a third frequency. In some embodiments, the second backscattering device 2 alternately transmits at the first frequency plus the second switching frequency and at the first frequency minus the second switching frequency. In some embodiments, the second backscattering device includes a second reflection amplifier 5 configured to increase a power of a signal generated by the second backscattering device 2.

Some abbreviations used herein are set forth below with their definitions.
Abbreviation Explanation
BPSK Binary PSK
BLE Bluetooth Low Energy
FET Field Effect Transistor
IoT Internet of Things
NB-IoT Narrowband IoT
PA Power Amplifier
PCR Primary Communications Radio
PHY Physical Layer
PSK Phase Shift Keying
QAM Quadrature Amplitude Modulation
RF Radio Frequency
TX Transmitter As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An apparatus to enable fast radio channel scanning at a wireless device, the apparatus comprising:
   a transceiver configured to receive a signal at a first frequency;
   a controller in communication with the transceiver and configured to compute a first difference frequency, the first difference frequency being a difference between the first frequency and a second frequency and to generate a first control signal;
   a first backscattering device in communication with the controller, the first backscattering device having a first switch configured by the first control signal from the controller to switch between at least two states at a switching frequency equal to the first difference frequency;
   when a signal is received at the first backscattering device at the second frequency, the first backscattering device being configured to generate a signal at the first frequency to be detected by the transceiver, the signal generated at the first frequency being based at least in part on the signal received by the first backscattering device at the second frequency; and
   the first backscattering device including an amplifier configured to amplify the signal generated at the first frequency to compensate reference signal received power, RSRP, measurements according to a reflection loss of the first backscattering device.

2. The apparatus of claim 1, wherein the controller is further configured to compute a second difference frequency being a difference between the first frequency and a third frequency and to generate a second control signal; and
   wherein the apparatus further includes a second backscattering device having a second switch configured by the second control signal to switch between at least two states at a switching frequency equal to the second difference frequency.

3. The apparatus of claim 2, wherein, when a signal is received at the second backscattering device at the third frequency, the second backscattering device generates a signal at the first frequency to be detected by the transceiver, the signal generated at the first frequency being based at least in part on the signal received by the second backscattering device at the third frequency.

4. The apparatus of claim 2, wherein the second backscattering device includes a second amplifier configured to increase a power of a signal generated by the second backscattering device.

5. The apparatus of claim 1, wherein the first frequency is at a center frequency of an operating RF channel of a network node.

6. A wireless device configured to scan a wireless communications medium, the wireless device comprising:
   a transceiver configured to receive a signal at a first frequency;
   a controller in communication with the transceiver and configured to compute a first difference frequency, the first difference frequency being a difference between the first frequency and a second frequency; and
   a first backscattering device in communication with the controller and being configured to switch between at least two states at a first switching frequency equal to the first difference frequency; and
   when a signal is received at the first backscattering device at the second frequency, the first backscattering device being configured to generate a signal at the first frequency to be detected by the transceiver, the signal generated at the first frequency being based at least in part on the signal received by the first backscattering device at the second frequency; and
   the first backscattering device being configured to amplify the signal generated at the first frequency to compensate reference signal received power, RSRP, measurements according to a reflection loss of the first backscattering device.

7. The wireless device of claim 6, wherein the first backscattering device alternately transmits at the first frequency plus the first switching frequency and at the first frequency minus the first switching frequency.

8. The wireless device of claim 6, further comprising a second backscattering device being configured to switch between at least two states at a second switching frequency computed by the controller, the second switching frequency being a difference between the first frequency and a third frequency.

9. The wireless device of claim 8, wherein the second backscattering device alternately transmits at the first frequency plus the second switching frequency and at the first frequency minus the second switching frequency.

10. The wireless device of claim 8, wherein the second backscattering device includes a second amplifier configured to increase a power of a signal generated by the second backscattering device.

* * * * *